Patented Apr. 11, 1933

1,903,503

UNITED STATES PATENT OFFICE

WALLACE T. CONN, OF WASHINGTON, DISTRICT OF COLUMBIA, ASSIGNOR TO THE GOVERNMENT OF THE UNITED STATES

METHOD AND PROCESS OF EXTRACTING OIL AND MOISTURE FROM "FISH PRESS CAKE"

No Drawing.   Application filed August 8, 1929.   Serial No. 384,504.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to a method for extracting oil and moisture from "fish press cake", and more particularly to a method and process for producing a high grade fish meal from oily fish, and for retrieving a high grade oil in the production of the fish meal.

As is well known, the usual process for reduction of oily fish is to cook the fish and then press the pulp to relieve the same of oil and moisture as much as possible. The drainage from the press is a conglomerate of water, oil, and some solid matter known as the press liquors, from which the present fish oil of commerce is retrieved. The press cake contains approximately 50 per cent. moisture or water and a variable amount of oil rarely less than 3 per cent. When dried, the cake contains a minimum of approximately 6 per cent. of oxidized oil for the reason that the removal of most of the water increases the content of the oil to approximately double the amount of that in the undried cake. Oxidation of the oil occurs irrespective of the method of drying of the cake. This oxidized oil negatives the value as a fertilizer of the fish meal produced and renders it of questionable value as feed stuff. At times, it is attempted to retrieve the oxidized oil from dried fish meal by extraction with common solvents, such as light gasoline but upon recovering the solvent, the residual oil is a dark product of relatively low value, and the meal produced contains a high percentage of dust.

An object of the present invention is to provide a method and process whereby oil and moisture may be extracted from fish press cake in a highly expeditious manner and at the same time produce a fish meal which is of an improved character.

It is also an object of the invention that the oil extracted from the fish press cake is usable and of a relatively high commercial value.

In carrying out the present method and process, press cake is prepared in the customary manner. The cake may be made from waste procured at canning or other factories, or markets, or made from menhaden, herring, or other oily fish when it is desired to convert the entire fish to meal and oil. The press cake is chopped up or masticated, as by passing the same through a meat grinder for the purpose of upsetting the masses of flesh, that is, disarranging the fibres of the flesh so as to expose the particles of oil and allow the easy penetration of a solvent. The chopped cake is placed in a tight container and covered with petroleum ether, or other suitable volatile solvent and allowed to stand for about ten minutes or such interval as found necessary in practice. The excess solution is drained from the chopped cake in the container and as much as possible of the retained solution removed by a vacuum pump or other suitable means. If desired, the extracted mass may be retained in the container and again covered with petroleum ether or other volatile solvent and the wash solution drained therefrom. This second wash of the material may be omitted if the oil is sufficiently removed by the first wash.

The above steps of my method and process leave the extracted solids, which were originally the chopped-up or masticated fish cake, with a very small amount of solvent therein. If this mass is exposed to the air it loses all trace of the solvent within a very short time. In manufacturing large quantities of fish meal it is preferred to dry the extracted mass in an oven or other suitable drier at, say, 60° C., and after being removed therefrom, ground to the fineness desired. The ground product is similar to that known to the trade as "fish meal" and is used as a fertilizer, as well as a feed stuff. The odor and superficial appearance of the meal obtained by the above method and process is similar to that known to the trade as vacuum dried cod meal, except for the color which is darker due to the color of the flesh of the fish used. The meal obtained has no excess of dust and a very low percentage of moisture. No solvent remains in the meal, while the percentage of protein is relatively high. An analysis of meal obtained from the menhaden fish is as follows:

|  | Per cent |
|---|---|
| Moisture | 5.2 |
| Ether extract | 1.47 |
| Protein | 75.03 |
| Ash | 17.3 |

The above analysis illustrates a very high grade of fish meal for fertilizer, as well as feed stuff. It should be noted that the press cake treated contained as high as 50 per cent. moisture. Manufacturers of extraction machinery usually contend that fish cake having more than 30 per cent. moisture can not be extracted. With my method and process the fish cake having a much higher per cent. of moisture can be treated and the oil and moisture removed, as heretofore defined. Treatment of the chopped fish cake with a volatile solvent as in my method and process relieves it of substantially all oil, which facilitates the removal of the moisture.

It also should be pointed out that the press cake should be treated as soon as possible after coming from the press for the reason that if permitted to remain in the air, the oil contained therein will oxidize to a certain extent and lower the relative value of the separated oil.

Now referring to the solution drained from the chopped cake when being treated with the petroleum ether or other volatile solvent, the oil therein can be easily retrieved and a product obtained of relatively high commercial value. The solution can be distilled on a water bath or by other suitable means and practically all the solvent recovered. The residue yields a good grade of fish oil, the acid content of which is very low. The acidity of oil obtained from menhaden fish by my process was 1.96 per cent. If the oil is exposed to the air for several days all traces of solvent odor will disappear. Also, if desired, air may be forced through the oil and in this way expel the odors of the solvent, but care should be exercised to avoid any undue oxidation of the oil; last traces of solvent may also be removed by exposure of the oil in vacuum or by similar means.

What I claim is:

1. The process which comprises forming "fish press cake", upsetting at least a portion of the material in the fish cake so as to expose the oil particle and facilitate the penetration of a solvent, subjecting the same to a volatile solvent, removing the moisture, volatile solvent and oil, and converting the remainder into meal or the like.

2. The process which comprises cooking fish, pressing the cooked fish to form "fish press cake", breaking up the fish cake so as to upset the fish fibre and expose the oil particles, and then washing the same with a volatile solvent.

3. The process which includes the steps of reducing "fish press cake" containing at least 30% moisture in such manner as to upset the regularity of the fish fibre and expose the oil particles so as to permit the ready penetration of a solvent, subjecting the reduced fish cake to a solvent and removing the solvent and oil.

4. The process which includes the steps of reducing "fish press cake" in such manner as to upset the regularity of the fish fibre and expose the oil particles so as to permit the ready penetration of the solvent, subjecting the reduced material to a volatile solvent, removing the volatile solvent and oil and treating the solvent and oil so as to remove the solvent and produce an oil having a low acid content.

WALLACE T. CONN.